United States Patent
Kawamura

(10) Patent No.: US 12,412,256 B2
(45) Date of Patent: Sep. 9, 2025

(54) ANOMALY DETECTION DEVICE, ANOMALY DETECTION METHOD, AND COMPUTER PROGRAM PRODUCT

(71) Applicant: KABUSHIKI KAISHA TOSHIBA, Tokyo (JP)

(72) Inventor: Naoki Kawamura, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 742 days.

(21) Appl. No.: 17/400,299

(22) Filed: Aug. 12, 2021

(65) Prior Publication Data
US 2022/0301140 A1    Sep. 22, 2022

(30) Foreign Application Priority Data
Mar. 16, 2021  (JP) ................ P2021-042811

(51) Int. Cl.
*G06T 7/00* (2017.01)
*G06F 18/22* (2023.01)

(52) U.S. Cl.
CPC ............ *G06T 7/0002* (2013.01); *G06F 18/22* (2023.01)

(58) Field of Classification Search
CPC ............................ G06T 7/0002; G06F 18/22
See application file for complete search history.

(56) References Cited

U.S. PATENT DOCUMENTS

| | | | |
|---|---|---|---|
| 10,593,033 B2 | 3/2020 | Niculescu-Mizil et al. | |
| 10,733,722 B2 | 8/2020 | Niculescu-Mizil et al. | |
| 10,937,230 B2* | 3/2021 | Kornienko | G06T 17/20 |
| 10,964,011 B2 | 3/2021 | Cosatto et al. | |
| 11,120,604 B2* | 9/2021 | Pang | G06T 11/001 |
| 12,047,595 B2* | 7/2024 | Maharana | H04N 19/50 |
| 2019/0042882 A1* | 2/2019 | Kim | G06N 3/045 |

(Continued)

FOREIGN PATENT DOCUMENTS

| | | | | |
|---|---|---|---|---|
| CN | 106844443 A | * | 6/2017 | ......... G06F 16/2237 |
| CN | 112422464 A | * | 2/2021 | ............. H04L 25/49 |

(Continued)

OTHER PUBLICATIONS

B. Du and L. Zhang, "A Discriminative Metric Learning Based Anomaly Detection Method," in IEEE Transactions on Geoscience and Remote Sensing, vol. 52, No. 11, pp. 6844-6857, Nov. 2014, doi: 10.1109/TGRS.2014.2303895. (Year: 2014).*

(Continued)

*Primary Examiner* — John Villecco
*Assistant Examiner* — Alexander John Rodgers
(74) *Attorney, Agent, or Firm* — Holtz, Holtz & Volek PC

(57) ABSTRACT

An anomaly detection device according to an embodiment includes an anomaly score map calculating unit, a correction score map calculating unit, and a correcting unit. The anomaly score map calculating unit calculates an anomaly score map indicating the degree of anomaly of the input data. The correction score map calculating unit uses the difference in the feature of one or more pieces of normal data included in a normal dataset, and calculates one or more correction score maps for correcting the anomaly score map. The correcting unit corrects the anomaly score map using the correction score maps.

8 Claims, 4 Drawing Sheets

(56) References Cited

U.S. PATENT DOCUMENTS

| | | | | |
|---|---|---|---|---|
| 2019/0304079 | A1* | 10/2019 | Min | G06N 3/08 |
| 2021/0010953 | A1* | 1/2021 | Adler | G06N 20/00 |
| 2021/0016288 | A1* | 1/2021 | Krivoy | G01N 21/76 |
| 2021/0081754 | A1* | 3/2021 | Frolova | G06N 3/04 |
| 2021/0182001 | A1* | 6/2021 | Levant | G06T 7/0004 |
| 2021/0287071 | A1* | 9/2021 | Ben Fadhel | H04L 63/1425 |
| 2021/0342633 | A1* | 11/2021 | Sung | G06T 7/97 |
| 2022/0058172 | A1* | 2/2022 | John | G06N 3/044 |
| 2022/0130048 | A1* | 4/2022 | Zhang | G06N 3/045 |
| 2022/0253995 | A1* | 8/2022 | Beck | G06V 10/993 |

FOREIGN PATENT DOCUMENTS

| | | | | | |
|---|---|---|---|---|---|
| CN | 112585523 | A | * | 3/2021 | G02B 27/00 |
| JP | 2020525940 | A | | 8/2020 | |
| TW | 202303275 | A | * | 1/2023 | |
| WO | WO-2021256321 | A1 | * | 12/2021 | H04N 17/002 |
| WO | WO-2022128013 | A1 | * | 6/2022 | G06N 20/00 |

OTHER PUBLICATIONS

Bergman, Liron, Niv Cohen, and Yedid Hoshen. "Deep nearest neighbor anomaly detection." arXiv preprint arXiv:2002.10445 (2020). (Year: 2020).*

Cohen, Niv, and Yedid Hoshen. "Sub-image anomaly detection with deep pyramid correspondences." arXiv preprint arXiv:2005.02357 (2020). (Year: 2020).*

Nolle, Timo, et al. "DeepAlign: alignment-based process anomaly correction using recurrent neural networks." International conference on advanced information systems engineering. Cham: Springer International Publishing, 2020. (Year: 2020).*

Cohen, et al., "Transformer-Based Anomaly Segmentation", arXiv. org, 2020.

* cited by examiner

ANOMALY DETECTION DEVICE, ANOMALY DETECTION METHOD, AND COMPUTER PROGRAM PRODUCT

CROSS-REFERENCE TO RELATED APPLICATIONS

This application is based upon and claims the benefit priority from Japanese Patent Application. No. 2021-042811, filed on Mar. 16, 2021; the entire contents of which are incorporated herein by reference.

FIELD

Embodiments described herein relate generally to an anomaly detection device, an anomaly detection method, and a computer program product.

BACKGROUND

A system for detecting anomalies in the input data, such as images, is known. For example, a technology has been disclosed for which, employing an autoencoder that has trained using only the normal data according to the teaching, difference processing of the target region in an image is performed and anomalies are detected from the input image. Moreover, for example, a technology has been disclosed for which anomalies are detected—based on the subtraction in the feature space of a pre-trained convolution neural network (CNN). In such systems, whether or not anomalies are present in the input data is determined in units of data; the anomalous sections in the data are identified; and the degree of anomaly at each position is displayed.

However, by the conventional technologies, there are cases where normal sections resembling anomalous ones, in the input data, are detected as anomalies. That is, by the conventional technologies, there are cases where the system cannot distinguish between anomalous sections and normal sections, whereby improving the anomaly detection accuracy is difficult.

DETAILED DESCRIPTION

An anomaly detection device according to an embodiment includes an anomaly score map calculating unit, a correction score map calculating unit, and a correcting unit. The anomaly score map calculating unit calculates an anomaly score map indicating a degree of anomaly of input data. The correction score map calculating unit uses a difference in feature of one or more pieces of normal data included in a normal dataset and calculates one or more correction score maps for correcting the anomaly score map. The correcting unit corrects the anomaly score map using the one or more correction score maps. An exemplary embodiment of an anomaly detection device, an anomaly detection method, and a computer program product is described below in detail with reference to the accompanying drawings.

Figure 1:
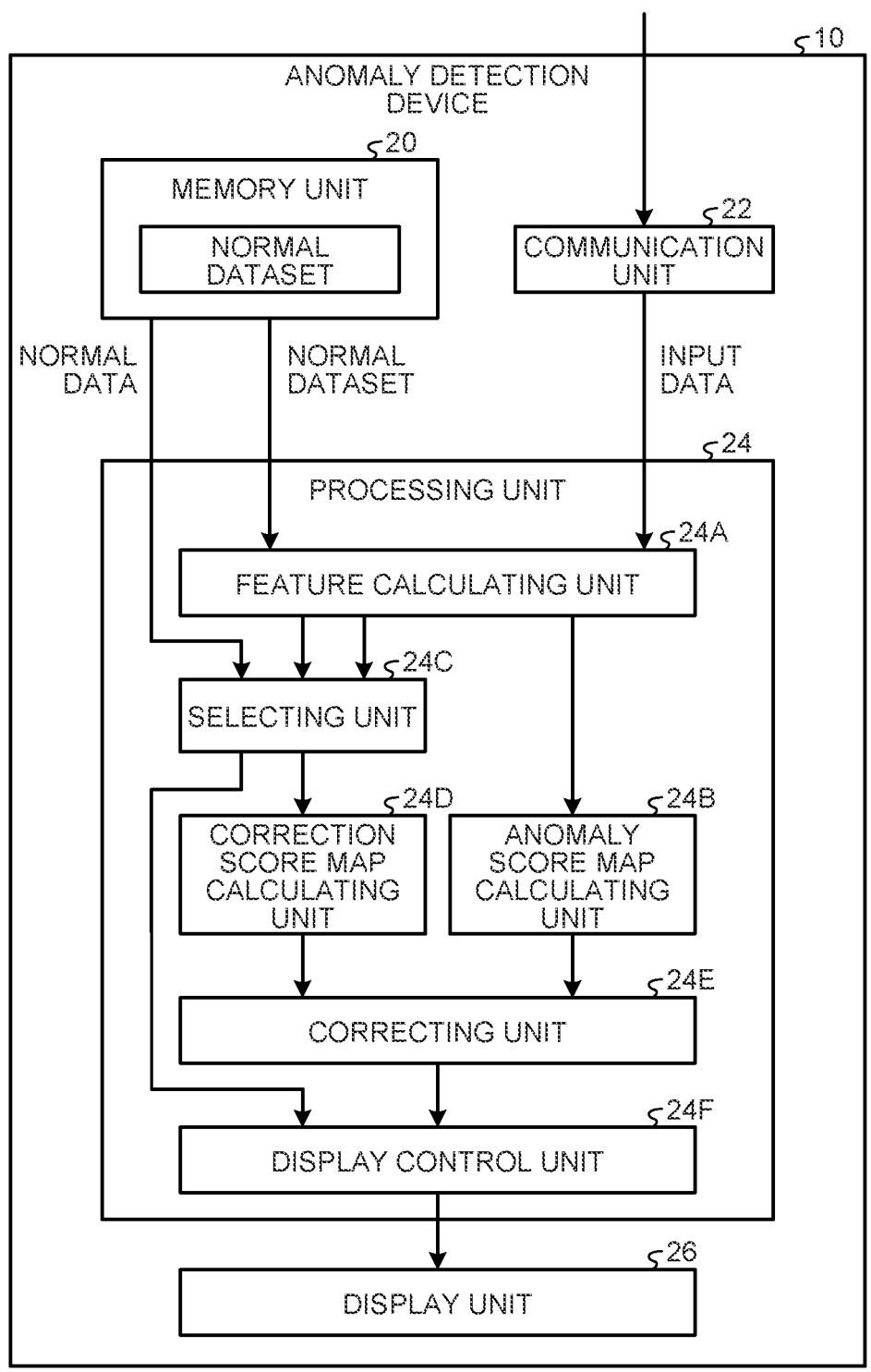
FIG. 1 is a schematic diagram illustrating an anomaly detection device.

FIG. 1 is a schematic diagram illustrating an example of an anomaly detection device 10 according to the embodiment.

The anomaly detection device 10 is a device for detecting anomalies in the input data.

The input data represents the target data for anomaly detection. For example, the input data is image data. In the embodiment, the explanation is given for the example in which the input data is in the form of image data.

The anomaly detection device 10 includes a memory unit 20, a communication unit 22, a processing unit 24, and a display unit 26. The memory unit 20, the communication unit 22, the processing unit 24, and the display unit 26 are connected to each other in a communicable manner.

The memory unit 20 is used to store a variety of data. Examples of the memory unit 20 include a semiconductor memory device such as a random access memory (RAM) or a flash memory; a hard disc; and an optical disc. Alternatively, the memory unit 20 can be an external memory device of the anomaly detection device 10. Still alternatively, the memory unit 20 can be a memory medium. More particularly, the memory medium can be used to store, temporarily or otherwise, computer programs and a variety of information downloaded via a local area network (LAN) or the Internet. Still alternatively, the memory unit 20 can be configured using a plurality of memory mediums.

In the embodiment, the memory unit 20 is used to store a normal dataset.

A normal dataset is composed of a group of one or more pieces of normal data. Herein, the normal data implies data not containing anomalous sections. For example, the normal data is in the form of image data. In the embodiment, the explanation is given for the example in which the normal data in the form of image data.

Moreover, in the embodiment, the explanation is given for the example in which the input data as well as the normal data is in the form of image data. However, the anomaly detection device 10 can be implemented for detecting anomalies in various types of data other than image data. For example, as long as the observation values are expressible as scalars, vectors, or multidimensional tensors; the input data and the normal data can be in the form of time-series videos, or voice signals, or skeleton data in which the posture of a human body is described in the form of a graph.

Moreover, as long as the normal data belongs to the same classification as the input data, it serves the purpose. Herein, the data is classified into a plurality of groups according to predetermined rules. For example, the data can be classified into image data, time-series videos, voice signals, and skeleton data.

In the embodiment, the explanation is given for the example in which the input data and the normal data are in the form of image data.

In the memory unit 20, image data that represents the captured images of the same photographic subject as captured in the input data and that does not contain anomalous sections is desirably stored in advance as the normal data.

For example, assume that the photographic subject of the captured images representing the input data is an object having a defective part. For example, assume that the object is a gear and the captured images of the gear having a defective part represent the input data. In that case, the normal dataset includes, as the normal data, one or more captured images of a gear not having any defective part.

Moreover, assume that the photographic subject of the captured images representing the input data is the scenery of a particular place. For example, assume that the captured images equivalent to one frame of a video, in which the scenery of a particular place is filmed, represents the input data. In that case, the normal dataset includes, as the normal data, the captured images equivalent to one or more frames of a video in which the scenery of the same place as the input data is filmed at a timing at which there are no anomalies.

The communication unit 22 communicates with other information processing devices via a known communication network such as a network.

The processing unit 24 performs a variety of information processing. Regarding the details of the processing unit 24, the explanation is given later.

The display unit 26 displays a variety of information. The display unit 26 is, for example, a display or a projector. Meanwhile, the anomaly detection device 10 can also include an input unit that receives operation instructions from the user. Examples of the input unit include a keyboard, a mouse, and a microphone. Moreover, the display unit 26 and the input unit can be configured in an integrated manner as a touch-sensitive panel.

Meanwhile, either at least the memory unit 20 or the processing unit 24 can be installed in an external information processing device such as a server device that is connected via a network and the communication unit 22. Moreover, at least one of the functional units of the processing unit 24 can be installed in an external information processing device such as a server device that is connected to the processing unit 24 via a network and the communication unit 22.

Given below is the detailed explanation of the processing unit 24.

The processing unit 24 includes a feature calculating unit 24A, an anomaly score map calculating unit 24B, a selecting unit 24C, a correction score map calculating unit 24D, a correcting unit 24E, and a display control unit 24F.

At least one of the feature calculating unit 24A, the anomaly score map calculating unit 24B, the selecting unit 24C, the correction score map calculating unit 24D, the correcting unit 24E, and the display control unit 24F is implemented using, for example, one or more processors. Herein, for example, the abovementioned constituent elements can be implemented by making a processor a central processing unit (CPU) execute computer programs, that is, can be implemented using software. Alternatively, the abovementioned constituent elements can be implemented using a dedicated integrated circuit (IC), that is, can be implemented using hardware. Still alternatively, the abovementioned constituent elements can be implemented using a combination of software and hardware. In the case of using a plurality of processors, each processor can be used to implement one of the constituent elements or to implement two or more constituent elements.

The feature calculating unit 24A calculates the feature quantity of each of one or more pieces of normal data included in a normal dataset, as well as calculates the feature quantity of the input data.

In the embodiment, the feature calculating unit 24A obtains the input data from an external information processing via the communication unit 22. Moreover, the feature calculating unit 24A obtains the normal data from the memory unit 20. Then, the feature calculating unit 24A calculates the feature quantities of the normal data and the input data.

A feature quantity includes, for example, at least either a feature map or a feature vector. In the embodiment, the explanation is given for the example in which the feature calculating unit 24A calculates the feature quantities including a feature map as well as a feature vector.

A feature map is derived by extracting the position-by-position feature value of the normal data or the input data as a scalar or a vector. As explained earlier, in the embodiment, the explanation is given for the example in which the normal data as well as the input data is in the form of image data. In that case, as an example, in a feature map, the pixel value of each pixel included in the image data is expressed as a feature value. Alternatively, as an example, when the image data is input to a pre-trained CNN, a feature map implies a feature map output in an intermediate layer.

A pre-trained CNN is a CNN trained using an arbitrary large-scale dataset. Examples of a pre-trained CNN include a CNN constructed by training an image classification task using the ImageNet dataset.

A feature vector describes the features represented by each of the normal data and the input data as a vector. As an example, when image data is input to the already-trained CNN, a feature vector implies a feature vector output in a fully connected layer.

The feature calculating unit 24A outputs the feature quantity of each of one or more pieces of normal data included in the normal dataset, and outputs the feature quantity of the input data to the selecting unit 24C. Moreover, the feature calculating unit 24A outputs the feature quantity of the input data to the anomaly score map calculating unit 24B.

Meanwhile, the feature calculating unit 24A can store the calculated feature quantities of the pieces of normal data in the memory unit 20 in a corresponding manner to the pieces of normal data used in the calculation. As a result of storing the feature quantities, regarding the pieces of normal data for which the feature quantities are already calculated, the feature calculating unit 24A can skip the feature quantity calculation.

The feature calculating unit 24A retrieves, from the memory unit 20, one or more pieces of image data that are of the captured images of the photographic subject having uhe same classification as the input data and that do not include anomalous sections. As far as retrieving the captured images of the same photographic subject as the input data is concerned, it can be performed using a known image processing technology. Then, the feature calculating unit 24A can calculate the feature quantities of the pieces of normal data included in the retrieved normal dataset.

Alternatively, the feature calculating unit 24A can obtain a normal dataset from an external information processing device via the communication unit 22, and can calculate the feature quantities. Still alternatively, the feature calculating unit 24A can obtain input data that is stored in advance in the memory unit 20, and can calculate the feature quantities.

Given below is the explanation of the anomaly score map calculating unit 24B. The anomaly score map calculating unit 24B calculates an anomaly score map that indicates the degree of anomaly of the input data.

An anomaly score map represents the data indicating the degree of anomaly at each position of the input data. For example, when the input data is in the form of image data, the anomaly score map represents the data for which the degree of anomaly is defined for each pixel in the input data.

The anomaly score map calculating unit 24B generates an anomaly score map using the feature quantity of the input data as received from the feature calculating unit 24A. For example, the anomaly score map calculating unit 24B calculates an anomaly score map indicating the pixel-by-pixel degree of anomaly using the feature quantities that are of the pixels constituting the input data and that represent a feature map calculated by the feature calculating unit 24A.

The anomaly score map calculating unit 24B can calculate an anomaly score map from the input data according to an arbitrary existing method. For example, the anomaly score map calculating unit 24B can calculate an anomaly score map in an identical manner to Non Patent Literature 1. More Particularly, for example, when the pieces of normal data included in the normal dataset and the input data are input to the pre-trained CNN; the anomaly score map calculating unit 24B can calculate, as an anomaly score map, the differences in the feature maps output in an intermediate layer.

Then, the anomaly score map calculating unit 24B outputs the calculated anomaly score map to the correcting unit 24E.

Given below is the explanation of the selecting unit 24C. The selecting unit 24C selects, as reference data, one or more pieces of normal data included in the normal dataset.

From among the pieces of normal data included in the normal dataset, the selecting unit 24C selects, as reference data, one or more pieces of normal data having a similar feature to the input data. Herein, the features represent at least either the feature quantities calculated by the feature calculating unit 24A or data acquisition conditions.

As explained earlier, a feature quantity implies at least either a feature vector or a feature map.

The following explanation is given for the case in which the pieces of normal data having a similar feature quantity are selected as the reference data. In that case, for example, from among one of more pieces of normal data included in the normal dataset, the selecting unit 24C selects k number of pieces of normal data, which have the feature vectors similar to the feature vector of the input data, in descend ng order of the degrees of similarity. Herein, k represents an integer equal to or greater than one. The selection count k can be set in advance. The descending order of the degrees of similarity is equivalent to the ascending order of the distances between the feature vectors. That is, from among the pieces of normal data included in the normal dataset, the selecting unit 24C selects k number of pieces of normal data as the reference data under the assumption that, shorter the distance of a feature vector to the input data, the higher is the degree of similarity. As far as the degree of similarity or the distance is concerned, for example, the normalized cross correlation or the Euclidean distance is usable.

Alternatively, for example, the selecting unit 24C can select the normal data using, as feature vectors, an arrangement of some portion of the feature map as one-dimensional vectors. In that case, the selecting unit 24C uses the feature map of the input data and the feature map of the normal data, and compares the degrees of similarity of the feature values at the same element positions. Herein, an element position implies, for example, a pixel position. Then, the selecting unit 24C can select, as the reference data, k number of pieces of normal data in descending order of the degrees of similarity. As far as the degree of similarity or the distance is concerned, for example, the normalized cross correlation or the Euclidean distance is usable.

Meanwhile, the selecting unit 24C can select, as the reference data, one or more such pieces of normal data which have the degrees of similarity with the input data to be equal to or greater than a predetermined threshold value.

The following explanation is given for the case in which the normal data having the acquisition condition similar to the input data is selected as the reference data.

Regarding the normal data and the input data, the acquisition condition represents at least one of the acquisition timing, the acquisition environment, the acquisition source, and the type.

The obtaining timing implies the timing at which the normal data or the input data is obtained. When the normal data as well as the input data is in the form of image data, the acquisition timing represents, for example, the photographing timing. When the normal data as well as the input data is in the form of voice signals, the acquisition timing represents, for example, the voice generation timing.

The acquisition environment implies the environment in which the normal data or the input data is obtained. Thus, the environment represents the location, the situation, the brightness, and the weather conditions. When the normal data as well as the input data is in the form of image data, the acquisition environment implies the photographing environment at the time of photographing the image data.

The acquisition source implies the source from which the normal data or the input data is obtained. For example, when the normal data as well as the input data is in the form of image data, the acquisition source represents identification information enabling identification of the camera used in photographing the normal data or the input data. When the normal data as well as the input data is in the form of voice signals, the acquisition source represents, four example, identification information enabling identification of the voice source such as the utterer of the voice.

The type implies the type of the normal data or the input data. For example, when the normal data as well as the input data is in the form of voice signals, the type represents, for example, the information indicating the language of the voice.

When the acquisition condition is used as the feature, the selecting unit 24C can select the normal data according to, for example, the method explained below.

For example, from among plural pieces of normal data included in the normal dataset, the selecting unit 24C selects, as the reference data, either the normal data having the degree of similarity with the acquisition condition of the input data to be equal to or greater than the threshold value, or a predetermined number of pieces of normal data in descending order of the degrees of similarity with the acquisition condition of the input data.

Meanwhile, the selecting unit 24C can obtain the acquisition condition of the normal data and the acquisition condition of the input data, and use them in selecting the normal data. The selecting unit 24C can obtain the acquisition conditions from the memory unit 20 or from an external information processing device via the communication unit 22. Alternatively, the selecting unit 24C can analyze the normal data and the input data using a known processing method, and obtain the acquisition conditions.

When the degree of similarity of the acquisition conditions is equal to or greater than a threshold value; it implies that, for example, the photographing location is repeated or the photographing timing is within a predetermined period of time.

More particularly, for example, assume that the input data is in the form of image data of captured images equivalent to a single frame of a video in which the scenery is filmed. Moreover, assume that the normal data included in the normal dataset is in the for of image data of the captured images of each of a plurality of frames of a video in which the identical scenery to the input data is filmed at a timing having no anomalies. In that case, from among plural pieces of normal data, the selecting unit 24C selects, as the reference data, the pieces of normal data of k number of frames in the order of close photographing timings of frames of the captured video representing the input data.

Then, the selecting unit 24C outputs the k number of selected pieces of reference data to the correction score map calculating unit 24D and the display control unit 24F.

The correction score map calculating unit 24D calculates one or more correction score maps either using one or more pieces of normal data output as the reference data by the selecting unit 24C or using the differences in the feature maps of one or more pieces of normal data included in the normal dataset. That is, in the embodiment, the correction score map calculating unit 24D calculates correction score maps without using the input data but using the differences in the feature maps of one or more pieces of normal data.

As explained earlier, a feature implies at least either a feature quantity or an acquisition condition. Moreover, as explained earlier, a feature quantity implies at least either a feature map or a feature vector. In the embodiment, the explanation is given about an example in which the correction score map calculating unit 24D calculates correction score maps using the differences in the feature maps of the pieces of normal data.

A correction score map is a map for correcting an anomaly score map. More specifically, a correction score map is a score map for correcting the degree of anomaly at each position in an anomaly score map. That is, a correction score map is used to improve the detection accuracy of the anomalous sections in an anomaly score map calculated by the anomaly score map calculating unit 24B.

The difference in the feature maps of the normal data indicates the magnitude of fluctuation in the data structure at each position in the normal data. Hence, by calculating correction score maps using the differences in the normal data, the correction score map calculating unit 24D can calculate a correction score map indicative of a higher score as the position has a larger fluctuation in the structure captured in the data.

In the first embodiment, based on the differences in the feature maps of the pieces of reference data selected by the selecting unit 24C, the correction score map calculating unit 24D calculates correction score maps indicative of a higher score as the difference is greater.

Assume that the selecting unit 24C selects only one piece of reference data. That is, assume the selection count k is equal to one. In that case, the correction score map calculating unit 24D calculates, for each position in the feature map of the reference data, the difference between mutually different positions. For example, the correction score map calculating unit 24D difference in the feature between different pixels. Then, the correction score map calculating unit 24D calculates a correction score map indicative of a higher score as the pixel has a larger difference.

Assume that the selecting unit 24C selects two or more pieces of reference data. That is, assume the selection count k is an integer equal to or greater than two.

In that case, the correction score map calculating unit 24D calculates, for each of plural pieces of reference data, a correction score map indicative of a higher score as the difference in feature from another piece of reference data is greater. For example, assume that the reference data is in the form of image data. In that case, the correction score map calculating unit 24D calculates, for each pixel, the difference in the value of the feature map from another pieces of reference data. Then, the correction score map calculating unit 24D calculates, for each of the plural pieces of reference data, a correction score map indicative of a higher score for the pixel having the greater difference in the value between the feature maps.

Hence, when k number of pieces of reference data are selected, the correction score map calculating unit 24D calculates k number of correction score maps.

More specifically, for example, from among k number of pieces of reference data, the correction score map calculating unit 24D utilizes the difference between the feature map of a particular piece of reference data $J_k$ and the feature map of each of the remaining k-1 number of pieces of reference data, and calculates correction score maps according to the following procedure.

Firstly, the correction score map calculating unit 24D calculates the difference between each feature value at each position in the piece of reference data $J_k$ from, among the k number of pieces of reference data and the most similar feature value from among the feature values at the corresponding position in each of the remaining k-1 number of pieces of reference data. In order to calculate the degree of similarity and the difference, for example, the normalized cross correlation or the Euclidean distance is usable.

For example, the calculation of a correction score map based on the Euclidean distance is given below in Equation (1).

$$S(J_k)_p = \frac{1}{M} \sum_{f \in N_M(F(J_k)_p)} \|F(J_k)_p - f\|^2 \quad (1)$$

In Equation (1), $J_k$ represents one of the k number of pieces of reference data. Moreover, $S(J_k)$ represents the correction score map corresponding to the reference data $J_k$. Furthermore, $F(J_k)$ represents the feature map calculated from the reference data $J_k$ by the feature calculating unit 24A. Moreover, $F(J_k)$, represents the feature value or the feature vector at a coordinate p in the tensor data.

Furthermore, $N_M(F(J_k)_p)$ represents the arithmetic operation in which, from among the feature vectors at all coordinates of each feature map of each of all pieces of reference data excluding the reference data $J_k$, M number of feature vectors similar to the feature map $F(J_k)$ of the reference data $J_k$ are selected for each coordinate p in the descending order of the degrees of similarity.

By calculating a correction score map using Equation (1), the correction score map calculating unit 24D can obtain a correction score map indicative of, for each position in the reference data $J_k$, a high score for the position that is dissimilar to the features in the other pieces of reference data. That is, in the reference data $J_k$, a position indicative of a high score can have a proportionally large fluctuation among plural pieces of normal data.

As explained above, the differences among the feature maps of one or more pieces of normal data indicate the magnitude of fluctuation of the data structure at each position in the normal data. For example, regarding the boundary between the shadow of a building and the road surface in a captured image, if the photographing timings are different, then the fluctuation becomes large even among normal images because the location of the shadow changes depending on the timing. Besides, regarding minute texture portions such as trees and bushes, regardless of the fact that the data structure is normal, there occurs a mismatch in the texture depending on the photographing timing or the photographing manner, and thus large fluctuation becomes easy to occur. Such a structure having large fluctuation even among the pieces of normal data is easily misidentified as an anomalous structure in spite of being a normal structure.

In that regard, the correction score map calculating unit 24D according to the embodiment calculates a correction score map that indicates the difference between a particular piece of reference data and one of the other pieces of reference data. Hence, the correction score map calculating unit 24D can calculate correction score maps for which a position having a large fluctuation in the data structure exhibits a proportionally high score. Moreover, also in the case in which a correction score map is calculated from only a single piece of reference data, the correction score map calculating unit 24D can calculate a correction score map for which a position having a large fluctuation in the data structure exhibits a proportionally high score.

The correction score map calculating unit 24D outputs the k number of calculated correction score maps to the correcting unit 24E.

The correcting unit 24E corrects an anomaly score map using the correction score maps. Hereinafter, an anomaly score map corrected by the correcting unit 24E is referred to as a corrected anomaly score map. The correcting unit 24E corrects an anomaly score map according to Equation (2), for example.

$$\hat{D}(I) = \frac{1}{K}\sum_{k}[D(I) - S(J_k)]_+ \quad (2)$$

As a result of using Equation (2), the correcting unit 24E corrects the degree of anomaly at each position of the coordinate p in the anomaly score map D(I) using the score of the corresponding position in the correction score maps, and takes a poll of the correction results for each piece of reference data.

As a result of performing such operations, regarding the anomalous sections in the input data, the correcting unit 24E maintains the degrees of anomaly in the anomaly score map. Then, regarding such sections in the input data which have a normal structure but are falsely set to have a high degree of anomaly in the anomaly score map due to a large fluctuation, the correcting unit 24E makes correction to reduce the degrees of anomaly.

As explained earlier, regarding the reference data representing the normal data, the differences in the feature maps indicate the magnitude of fluctuation of the data structure at each position in the normal data. Hence, in a correction score map, a position having a large fluctuation in the data structure exhibits a proportionally high score. Thus, by correcting an anomaly score map using the correction score maps, the correcting unit 24E can correct the degrees of anomaly of such normal sections in the anomaly score map at which the fluctuation is large among the pieces of normal data. Hence, the correcting unit 24E becomes able to generate a corrected anomaly score map by reducing overdetection at the sections that are not originally anomalous sections and by enhancing the anomaly detection accuracy.

That is, the correcting unit 24E can generate a corrected anomaly score map by holding down overdetection by which normal sections are detected as anomalous sections.

The display control unit 24F displays the corrected anomaly score map in the display unit 26. As a result, the display control unit 24F can present the anomalous sections in the input data in a visualized form to the user.

It is desirable that the display control unit 24F displays the corrected anomaly score map in a display form corresponding to the degree of anomaly. For example, the display control unit 24F displays the corrected anomaly score map in a display form that calls for more attention in proportion to the degree of anomaly. For example, the display control unit 24F displays, in the display unit 26, the corrected anomaly score map in the form of a heatmap for which positions having a high degree of anomaly are displayed in red color and positions having a low degree of anomaly are displayed in blue color. At that time, the display control unit 24F performs a transparent display of the heat map and displays it in an overlapping manner on the input data.

As a result, the user can look at the display unit 26 and easily check the degree of anomaly at each position in the input data.

Alternatively, regarding such positions in the corrected anomaly score map which have the degrees of anomaly to be equal to or greater than a threshold value, the display control unit 24F can display those positions in a highlighted manner by enclosing them in rectangles.

Still alternatively, the display control unit 24F can display the corrected anomaly score map along with the reference data in the display unit 26. For example, the display control unit 24F can display the corrected anomaly score map and the reference data side by side in the display unit 26. The display control unit 24F can display all pieces of reference data in the display unit 26, or can display only a single piece of reference data in the display unit 26. Alternatively, the display control unit 24F can display, in the display unit 26, a single piece of reference data that is most similar to the input data.

As a result of displaying the corrected anomaly score map and the reference data in the display unit 26, the user becomes able to easily check the input data containing anomalous sections and the modality in the normal case in which the input data does not contain anomalous sections.

Meanwhile, the display control unit 24F can also perform postprocessing with respect to the corrected anomaly score map. For example, the display control unit 24F can perform, as postprocessing, a correction operation for displaying a predetermined target region of the corrected anomaly score map in a highlighted manner. The target region can be, for example, a specific object or the region of a specific object included in the input data. However, the target region is not limited to those examples.

Figure 2:
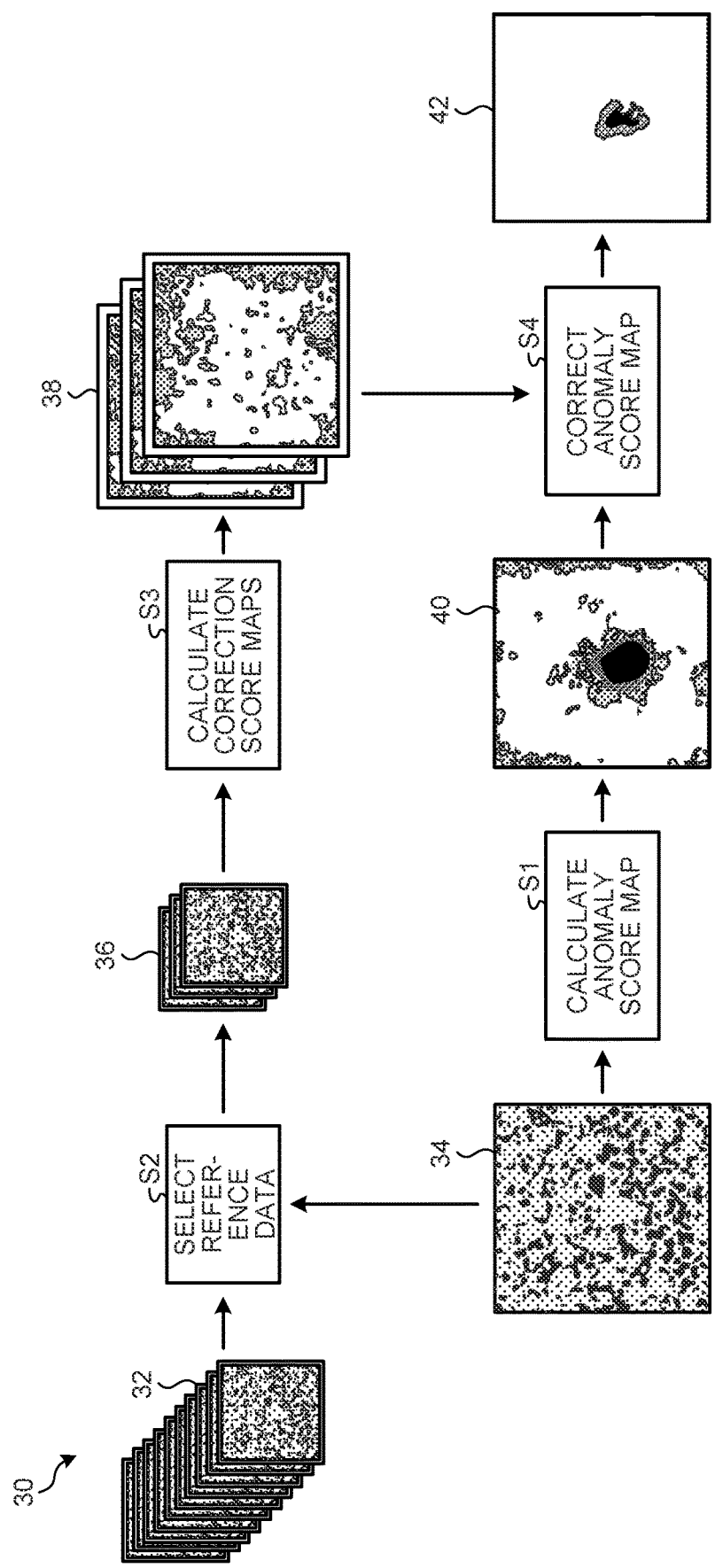
FIG. 2 is an explanatory diagram for explaining an overview of the flow of anomaly detection.

Given below is the explanation of an exemplary overview of the overall flow related to anomaly detection in the input data. FIG. 2 is an explanatory diagram for explaining an overview of the flow of anomaly detection.

The anomaly score map calculating unit 24B calculates an anomaly score map 40 from input data 34 (Step S1).

Then, from among pieces of normal data 32 included in a normal dataset 30, the selecting unit 24C, selects as pieces of reference data 36, the pieces of normal data 32 having a similar feature to the input data 34 (Step S2).

Subsequently, from k number of pieces of reference data 36, the correction score map calculating unit 24D calculates k number of correction score maps 38 (Step S3).

The correcting unit 24E corrects the anomaly score map 40 using the correction score maps 38 and generates a corrected anomaly score map 42 (Step S4).

The display control unit 24F displays the corrected anomaly score map 42 in the display unit 26.

Given below is the explanation of the flow of information processing performed by the processing unit 24 of the anomaly detection device 10.

Figure 3:
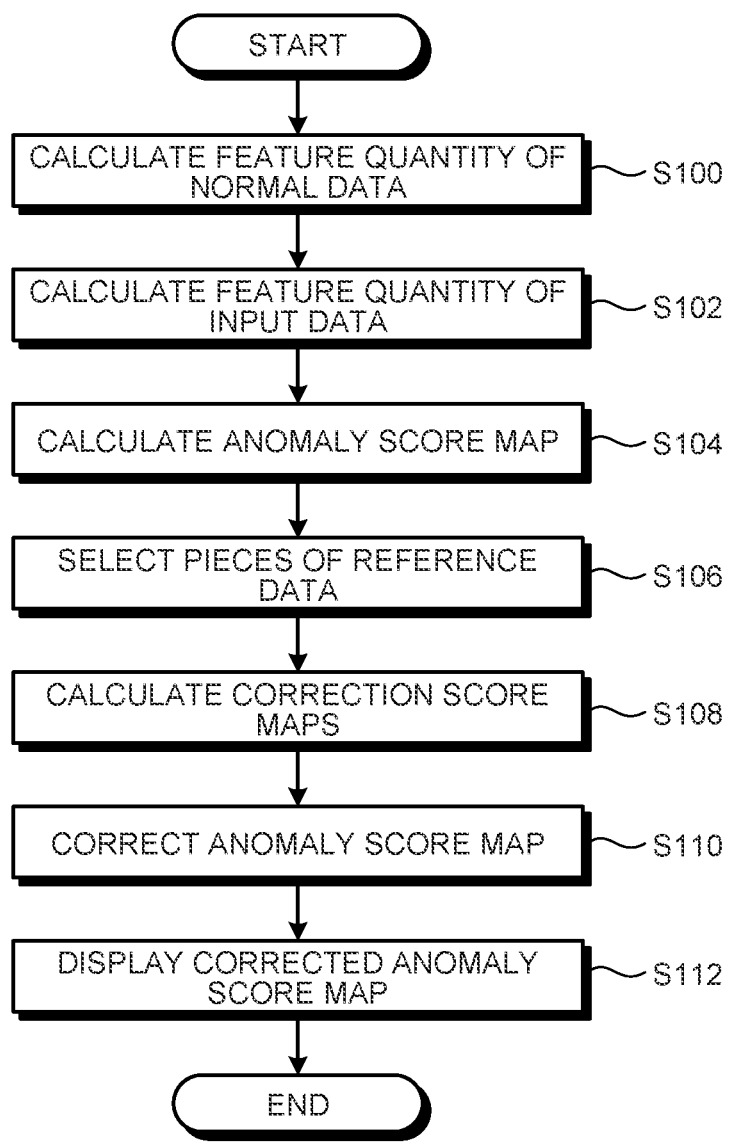
FIG. 3 is a flowchart for explaining an exemplary flow of information processing.

FIG. 3 is a flowchart for explaining an exemplary flow of information processing performed in the anomaly detection device 10.

The feature calculating unit 24A calculates the feature quantity of each of one or more pieces of normal data 32 included in the normal dataset 30 (Step S100). Moreover, the feature calculating unit 24A calculates the feature quantity of the input data 34 (Step S102).

The anomaly score map calculating unit 24B calculates the anomaly score map 40 using the feature quantity of the input data 34 as calculated at Step S102 (Step S104).

From among the pieces of normal data 32 included in the normal dataset 30, the selecting unit 24C selects, as the pieces of reference data 36, the pieces of normal data 32 having a similar feature to the input data 34 (Step S106).

The correction score map calculating unit 24D calculates the correction score maps 38 using the pieces of reference data 36 selected at Step S106 (Step S108).

The correcting unit 24E corrects the anomaly score map 40, which is calculated at Step S104, using the correction score maps 38 calculated at Step S108 (Step S110). As a result of performing the operation at Step S110, the anomaly score map 40 gets corrected to the corrected anomaly score map 42.

The display control unit 24F displays the corrected anomaly score map 42, which is generated at Step S110, in the display unit 26 (Step S112). That marks the end of the present routine.

As explained above, the anomaly detection device 10 according to the embodiment includes the anomaly score map calculating unit 24B, the correction score map calculating unit 24D, and the correcting unit 24E. The anomaly score map calculating unit 24B calculates the anomaly score map 40 that indicates the degree of anomaly of the input data 34. The correction score map calculating unit 24D uses the differences in the feature maps of one or more pieces of normal data 32 included in the normal dataset 30, and calculates one or more correction score maps 38 for correcting the anomaly score map 40. The correcting unit 24E corrects the anomaly score map 40 using the correction score maps 38.

In the conventional technology, there are cases where, in the input data 34, the positions having a normal structure but having a large fluctuation are falsely determined to be anomalous sections in spite of being normal sections. That is because, in the input data 34, the positions having a normal structure but having a large fluctuation among the pieces of data are likely to have high degrees of anomaly and are likely to be overly detected as anomalies by mistake.

For example, when the input data 34 is in the form of a captured image, there are times when the positions of the edges included in that captured image or the portions in the captured image having a large fluctuation depending on the photographing time slot are falsely determined to be anomalous sections in spite of being normal sections. The portions having a large fluctuation depending on the photographing time slot are, for example, the spots that undergo a change in the brightness according to the time slot. For that reason, in the conventional technology, there are cases where overdetection occurs in which normal sections are determined as anomalous sections.

Moreover, in the conventional technology, during the detection of anomalous sections in the data, it is difficult to distinguish between the normal class and the anomaly class. One of the reasons for that is as follows. There is a large variety of modalities of the anomalous sections in the data, and the normal sections too have a large fluctuation in the modalities among the pieces of data. Accordingly, between the normal class and the anomaly class, the identification boundary in the statistical distribution becomes unclear. Herein, a modality implies the looks or the external appearance manifesting in the data.

Furthermore, in the conventional technology, in order to extract the anomalous sections in the input data 34, in a large proportion of cases, the degree of anomaly is calculated for each position in the input data 34. At that time, if the normal sections exhibit a large fluctuation among the pieces of data, then the degrees of anomaly of the normal sections and the degrees of anomaly of the anomalous sections are calculated as comparable numerical values. Hence, in the conventional technology, the original normal sections and the anomalous sections cannot, be correctly differentiated, thereby resulting in overdetection.

Meanwhile, for example, a technology has been disclosed in which the target region in an image is kept limited so as to hold down overdetection in the entire image. However, in such a conventional technology, there is no mechanism to hold down overdetection within the target region.

Moreover, a technology has been disclosed in which the differences in the feature spaces of a pre-trained CNN are used. However, in that, conventional technology, there is no mechanism to hold down overdetection, and the normal sections having a large fluctuation remain likely to be falsely detected as anomalous sections.

On the other hand, in the anomaly detection device 10 according to the embodiment, the anomaly score map 40 of the input data 34 is corrected using the correction score maps 38 that are calculated from the differences in the feature maps of the pieces of normal data 32. The differences in the feature maps of the pieces of normal data 32 indicate the magnitude of fluctuation in the data structure at each position in the normal data. For that reason, in the correction score maps 38, the sections of the normal data 32 which have the structure with a large fluctuation exhibit a proportionally high score, and the sections of the normal data 32 which have the structure with a small fluctuation exhibit a proportionally low score.

In the anomaly detection device 10, the anomaly score map 40 is corrected using the correction score maps 38. Hence, in the anomaly detection device 10, the degree of anomaly of the anomaly score map 40 can be corrected so as to ensure that the sections in the input data 34 having a normal structure but having a large fluctuation are determined to be normal sections. That is, in the anomaly detection device, as a result of using the correction score maps 38 that are calculated from the differences in the feature maps of the pieces of normal data 32, the anomaly score map 40 can be corrected in such a way that the sections in the input data 34 having a large fluctuation are set with lower degrees of anomaly.

That is, in the anomaly detection device 10 according to the embodiment, the differences in the features of the normal data are put to use and the degrees of anomaly of the normal sections having a large fluctuation are corrected. Hence, it becomes possible to reduce overdetection at the sections that are not originally anomalous sections, and to enhance the anomaly detection accuracy.

Thus, the anomaly detection device 10 according to the embodiment enables achieving enhancement in the anomaly detection accuracy.

Moreover, in the anomaly detection device 10 according to the embodiment, from among the pieces of normal data 32 included in the normal dataset 30, the selecting unit 24C selects, as the pieces of reference data 36, one or more pieces of normal data having a similar feature to the input data 34. Then, based on the differences in the features of the pieces of reference data 36, the correction score map calculating unit 24D calculates the correction score maps 38 having the scores in proportion to the differences.

In this way, in the anomaly detection device 10 according to the embodiment, the selecting unit 24C selects, as the pieces of reference data 36, The pieces of normal data having a similar feature to the input data 34. Hence, the selecting unit 24C can select specific pieces of normal data 32 while evaluating the objective function of the input data 34. For that reason, as compared to the case in which the pieces of reference data 36 are not used, the selecting unit 24C becomes able to select the pieces of normal data 32 that are in accordance with the objective of the task of the input data 34. Hence, in the anomaly detection device 10, it becomes possible to accurately correct the degrees of anomaly of such positions in the normal data 32 which have a large fluctuation. As a result, in addition to achieving the effects explained above, the anomaly detection device 10 enables achieving further enhancement in the anomaly detection accuracy.

Moreover, in the embodiment, the display control unit 24F displays the corrected anomaly score map 42 in the display unit 26.

Hence, in the anomaly detection device 10 according to the embodiment, the degree of anomaly at each position in the input data 34 can be presented to be visibly confirmable with ease.

Furthermore, in the embodiment, the display control unit 24F displays the corrected anomaly score map 42 and the reference data 36 in the display unit 26.

Hence, in the anomaly detection device 10 according to the embodiment, in addition to presenting the degree of anomaly of the input data 34, the appearance of the input data 34 in the normal state can be presented in a confirmable manner.

Given below is the explanation of an exemplary hardware configuration of the anomaly detection device 10 according to the embodiment.

Figure 4:
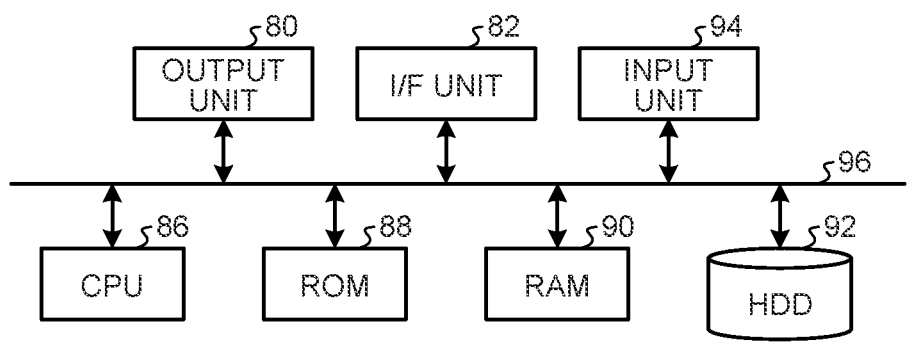
FIG. 4 is a diagram illustrating an exemplary hardware configuration.

FIG. 4 is a diagram illustrating an exemplary hardware configuration of the anomaly detection device 10 according to the embodiment.

The anomaly detection device 10 according to the embodiment has the hardware configuration of a commonly-used computer that includes a control device such as a CPU 86; memory devices such as a read only memory (ROM) 88, a random access memory (RAM) 90, and a hard disc drive (HDD) 92; an I/F unit 82 representing an interface with various devices; an output unit 80 that outputs a variety of information such as output information; an input unit 94 that receives user operations; and a bus 96 that connects the other components to each other.

In the anomaly detection device 10 according to the embodiment, the CPU 86 reads computer programs from the ROM 88, loads them in the RAM 90, and executes them. As a result, the constituent elements explained earlier are implemented in the computer.

The computer programs for implementing various operations of the anomaly detection device 10 according to the embodiment can be stored in the HDD 92. Alternatively, the computer programs for implementing various operations of the anomaly detection device 10 according to the embodiment can be stored in advance in the ROM 88.

Still alternatively, the computer programs for implementing various operations of the anomaly detection device 10 according to the embodiment can be stored as installable or executable files in a computer-readable memory medium such as a compact disc read only memory (CD-ROM), a compact disc recordable (CD-R), a memory card, a digital versatile disk (DVD), or a flexible disc (FD); and can be provided as a computer program product. Still alternatively, the computer programs for implementing various operations of the anomaly detection device 10 according to the embodiment can be stored in a downloadable manner in a computer connected to a network such as the Internet. Still alternatively, the computer programs for implementing various operations of the anomaly detection device 10 according to the embodiment can be distributed via a network such as the Internet.

Meanwhile, the anomaly detection device 10 according to the embodiment can be implemented in an arbitrary anomaly detector that calculates the anomaly score map 40 during the process of anomaly detection. That is, as the anomaly score map calculating unit 24B, an arbitrary anomaly detector can be installed. If the functional units of the anomaly detection device 10 according to the embodiment are implemented as modules in an arbitrary anomaly detector, it becomes possible to hold down overdetection of normal structures that are easy to mistake for anomalies. Moreover, regarding the modules of the functional units of the anomaly detection device 10 according to the embodiment, since the training of any actual modules is not required, the anomaly detection accuracy can be enhanced in an easy and effective manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An anomaly detection device comprising:
at least one hardware processor configured to execute processes comprising:
calculating a difference in feature map output in an intermediate layer when each of one or more pieces of normal data included in a normal dataset and input data are input to a pre-trained convolution neural network (CNN) as an anomaly score map indicating a degree of anomaly of the input data, the input data and the normal data being photographed image data;
selecting, as reference data, one piece of the normal data which is included in the normal dataset and which is determined to have a photographing condition whose degree of similarity with a photographing condition of the input data is equal to or greater than a predetermined threshold value;
by using a difference in feature within the one piece of the normal data selected as the reference data, calculating a correction score map for correcting the anomaly score map, the calculated correction score map indicating a higher score as the difference in feature is greater;
correcting the anomaly score map by using the correction score map; and
displaying, on a display, a corrected anomaly score map that represents the anomaly score map corrected by using the correction score map.

2. The anomaly detection device according to claim 1, wherein the at least one hardware processor is further configured to select plural pieces of the reference data, and to calculate the correction score map for each of the plural pieces of reference data, such that the calculated correction score map indicates a higher score as the difference in feature from another piece of reference data is greater.

3. The anomaly detection device according to claim 1, wherein the photographing condition represents at least one of a photographing timing, a photographing environment, and identification information of a camera that has performed photography, for the normal data and the input data.

4. The anomaly detection device according to claim 1, wherein the at least one hardware processor is configured to select, as the reference data, a predetermined number of pieces of the normal data in descending order of degree of similarity with the photographing condition of the input data.

5. The anomaly detection device according to claim 1, wherein the at least one hardware processor is configured to display, on the display, the corrected anomaly score map in a display form corresponding to the degree of anomaly.

6. The anomaly detection device according to claim 1, wherein the at least one hardware processor is configured to display the corrected anomaly score map and reference data on the display.

7. An anomaly detection method implemented by at least one hardware processor, the method comprising:
   calculating a difference in feature map output in an intermediate layer when each of one or more pieces of normal data included in a normal dataset and input data are input to a pre-trained convolution neural network (CNN) as an anomaly score map indicating a degree of anomaly of the input data, the input data and the normal data being photographed image data;
   selecting, as reference data, one piece of the normal data which is included in the normal dataset and which is determined to have a photographing condition whose degree of similarity with a photographing condition of the input data is equal to or greater than a predetermined threshold value;
   calculating, by using a difference in feature within the one piece of the normal data selected as the reference data, a correction score map for correcting the anomaly score map, the calculated correction score map indicating a higher score as the difference in feature is greater;
   correcting the anomaly score map by using the correction score map; and
   displaying, on a display, a corrected anomaly score map that represents the anomaly score map corrected by using the correction score map.

8. A computer program product having a non-transitory computer readable medium including programmed instructions stored thereon, wherein the instructions, when executed by a computer, cause the computer to execute processes comprising:
   calculating a difference in feature map output in an intermediate layer when each of one or more pieces of normal data included in a normal dataset and input data are input to a pre-trained convolution neural network (CNN) as an anomaly score map indicating a degree of anomaly of the input data, the input data and the normal data being photographed image data;
   selecting, as reference data, one piece of the normal data which is included in the normal dataset and which is determined to have a photographing condition whose degree of similarity with a photographing condition of the input data is equal to or greater than a predetermined threshold value;
   calculating, by using a difference in feature within the one piece of the normal data selected as the reference data, a correction score map for correcting the anomaly score map, the calculated correction score map indicating a higher score as the difference in feature is greater;
   correcting the anomaly score map by using the correction score map; and
   displaying, on a display, a corrected anomaly score map that represents the anomaly score map corrected by using the correction score map.

* * * * *